March 13, 1945.   C. F. HAMMOND   2,371,442
IRREVERSIBLE TRANSMISSION
Filed Dec. 21, 1942   2 Sheets-Sheet 1
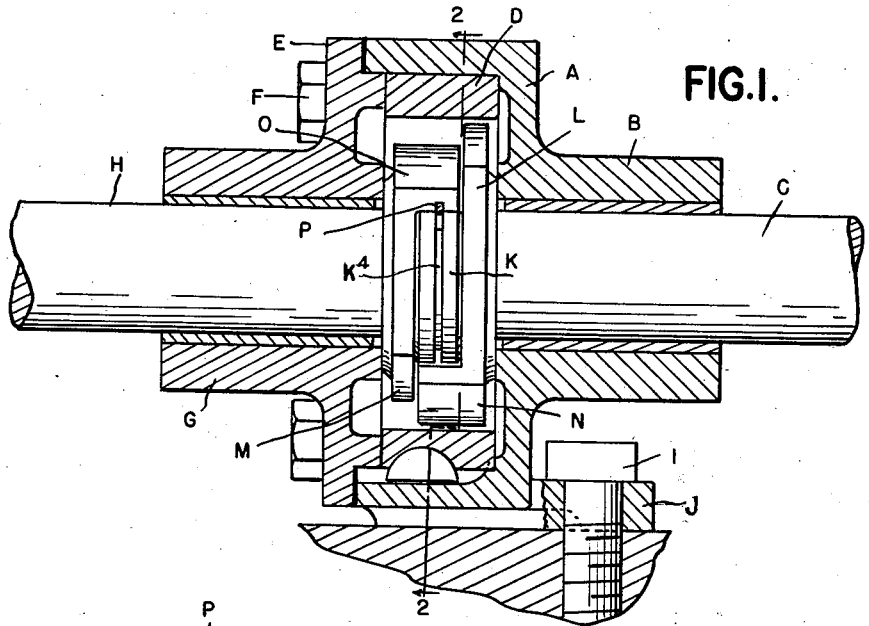
FIG.1.
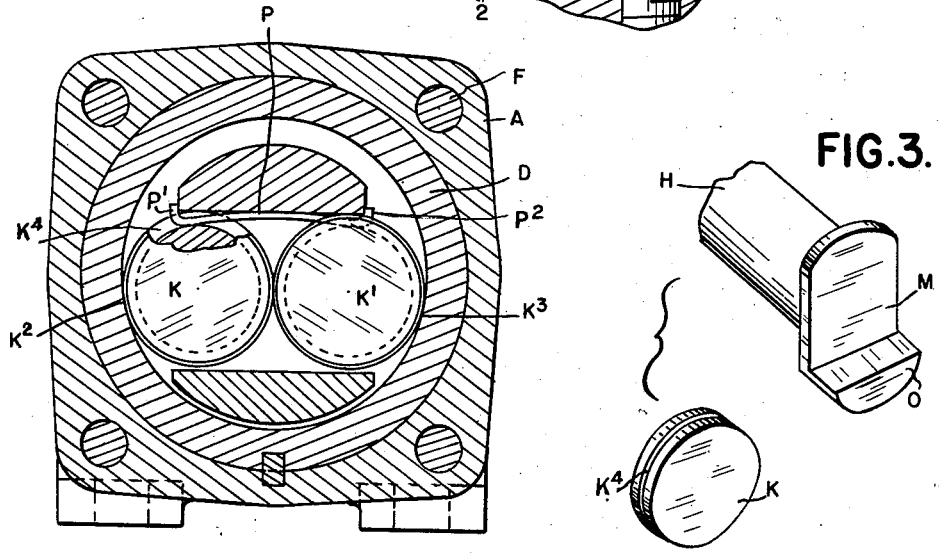
FIG.2.
FIG.3.
INVENTOR.
CHARLES F. HAMMOND
BY
ATTORNEYS March 13, 1945.  C. F. HAMMOND  2,371,442
IRREVERSIBLE TRANSMISSION
Filed Dec. 21, 1942  2 Sheets-Sheet 2

INVENTOR.
CHARLES F. HAMMOND
BY
*Whittemore Hulbert & Belknap*

ATTORNEYS

Patented Mar. 13, 1945

2,371,442

UNITED STATES PATENT OFFICE 2,371,442

IRREVERSIBLE TRANSMISSION

Charles F. Hammond, Grosse Pointe, Mich., assignor to Gemmer Manufacturing Company, Detroit, Mich., a corporation of Michigan Application December 21, 1942, Serial No. 469,691

7 Claims. (Cl. 192—8)

The invention relates to irreversible transmission mechanisms and it is the object of the invention to obtain a construction which may be used as a coupling between rotary drive and driven members and which is freely rotatable in opposite directions under the actuation of the drive member but will lock from movement in either direction under actuation of the driven member. To this end, the invention consists in the construction as hereinafter set forth. In the drawings:

Figure 1 is a longitudinal section through my improved irreversible transmission as applied to axially aligned rotary drive and driven members;

Figure 2 is a cross section on line 2—2, Figure 1;

Figure 3 is a perspective view of some of the parts detached; and

Figure 4:
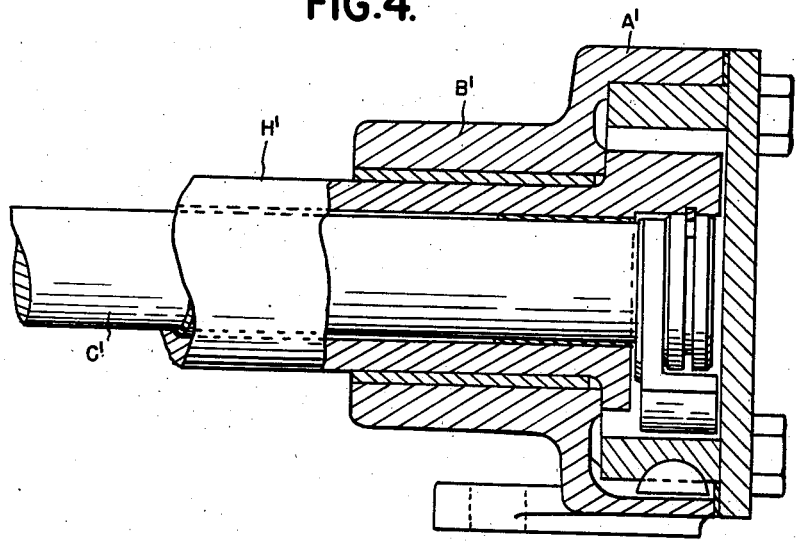
Figures 4 and 5 are views similar respectively to Figures 1 and 2 illustrating a modified construction.

As illustrated, A is a housing member having formed integral therewith a journal bearing B for a rotary drive shaft C. Within the housing is an annular member D which forms an internal raceway. E is a detachable head for the housing A which has a stepped engagement therewith and is secured thereto by bolts F. G is a journaled bearing integral with the head E which is in axial alignment with the bearing B and receives the driven shaft H. The housing A is rigidly secured to any suitable supporting base by blots I passing through apertured lugs J.

Within the recess formed by the annular raceway D is arranged a pair of members K and K' of cylindrical form. These members are of a diameter such that the sum of the diameters of the two members is less than the internal diameter of the raceway D. Thus, when placed within the recess, the members K and K' will contact with each other and will also contact with the race member at points $K^2$ and $K^3$, which are offset to one side of points diametrically opposite in said race member. The shafts C and H are provided with heads L and M which are also within the recess of the raceway D and upon opposite sides of the members K and K'. These heads are provided with eccentric projections N and O arranged respectively on opposite sides of the members K and K'. The projection N from the head L has its inner face slightly spaced from the peripheries of the members K and K' when the latter are in contact with each other and with the race member D. On the other hand, the projection O from the head M is in close contact with each of said members K and K'. Thus, when the shaft C is rotated in either direction, it will transmit motion through one or the other of the members K and K' to the projection O thereby communicating movement to the shaft H. Such rotation is free inasmuch as the member K or K' will be moved by the pressure of the projection N out of frictional contact with the race member D. If, however, a torque is applied to the shaft H in either direction, this will cause the members K and K' to frictionally lock against the race member D so as to prevent any rotation of said shaft. In other words, any force transmitted to the members K and K' from the projection O will be within the angle of friction with respect to the contact points between said members and the race member D.

To insure the instantaneous locking without permitting any rotation of the shaft H by torque directly applied thereto, it is essential that the members K and K' should be held in tight contact with each other and with their points of bearing on the race member D. This is accomplished by a resilient member P which is interposed between the projection O and each of the members K and K'. As shown, this member P is a spring bowed upward to centrally contact with the member O and having its opposite end portions bearing against the members K and K'. To retain the spring in this position, its opposite ends are bent upward at P' and $P^2$ to embrace the member O. Also the members K and K' are preferably grooved at $K^4$ to receive the end portions of the member P which bear against the bottom of these grooves. This construction will hold the members K and K' always in frictional contact with the race member D even after wear in any of the parts which might enlarge the clearances therebetween. The members K and K', therefore, perform the dual function. First, as transmission links between the members N and O under actuation of the former and, second, as locking dogs preventing any actuation by the member O.

Figure 5:
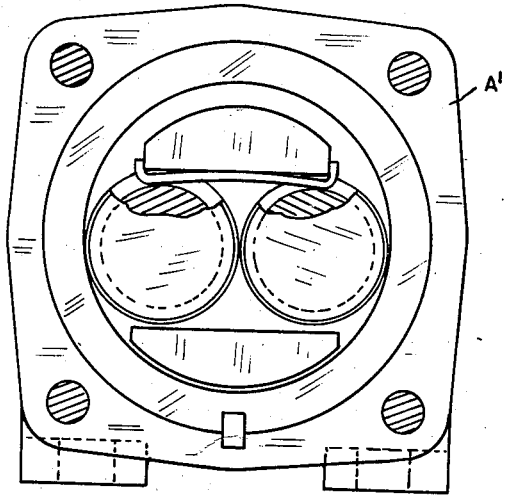

In the modified construction shown in Figures 4 and 5, the driven shaft H' is sleeved about the drive shaft C' so that both are arranged on the same side of the housing A' and are journaled in the same bearing B'. The construction is otherwise substantially the same as that previously described.

What I claim as my invention is:

1. The combination with rotary drive and driven members of an irreversible transmission therebetween, freely rotatable therewith in either direction under actuation of said drive member while locking from movement in either direction by torque transmitted from said driven member, said transmission comprising an anchor member recessed to form an internal raceway, a pair of dogs in said recess whose combined diameters is less than the diameter of said raceway to have contact therewith at spaced points offset to one side of diametrically opposite points therein, eccentric bearings on said drive and driven members arranged respectively on opposite sides of said pair of dogs, the bearing of said drive member being on the side of said dogs farthest removed from the center of said raceway, and means for applying resilient pressure to said dogs on the opposite side thereof to press the same in contact with each other and with said spaced points in said raceway.

2. An irreversible transmission mechanism comprising an anchor member recessed to form an internal raceway, a pair of dogs in said recess whose combined diameters is less than the diameter of said raceway, means for resiliently pressing said dogs in contact with each other and with spaced points in said raceway offset on one side of diametrically opposite points therein, rotary drive and driven members having eccentric portions projecting into said recess respectively on opposite sides of said pair of dogs, the eccentric portion of said drive member being on the side of said dogs farthest removed from the center of said raceway whereby rotation of said drive member in either direction will relieve pressure contact of said dogs on said raceway and will freely transmit motion to said driven member while torque from said driven member in either direction will increase pressure contact between said dogs and said raceway to lock the same from relative movement.

3. An irreversible transmission comprising an anchor member recessed to form an internal cylindrical raceway, a pair of cylindrical dogs in said recess whose combined diameters is less than the diameter of said raceway, means for resiliently pressing said dogs in contact with each other and with spaced points in said raceway offset on one side of diametrically opposite points therein, rotary drive and driven members having eccentric portions projecting into said recess respectively on opposite sides of said pair of dogs, the eccentric portion of said drive member being on the side farthest removed from the center of said raceway whereby rotation of said drive member in either direction will relieve pressure contact of said dogs on said raceway and will freely transmit motion to said driven member while torque from said driven member in either direction will increase pressure contact between said dogs and said spaced points in said raceway locking the same from relative rotation.

4. An irreversible transmission member comprising an anchor member recessed to form an internal cylindrical raceway, a pair of cylindrical dogs in said recess whose combined diameters is less than the diameter of said raceway whereby said dogs contact with said raceway at points offset on one side of diametrically opposite points therein, rotary drive and driven members having eccentric portions projecting into said recess respectively on opposite sides of said pair of dogs, the eccentric portion of said drive member being on the side of said dogs farthest removed from the center of said raceway and with a slight clearance between the same and said dogs, and a resilient member between and contacting with the eccentric portion of said driven member and each of said dogs for pressing the latter into said contact with each other and with said spaced points in said raceway.

5. An irreversible transmission mechanism comprising an anchor member recessed to form an internal cylindrical raceway, a pair of cylindrical dogs in said recess whose combined diameters is less than the diameter of said raceway whereby said dogs contact with said raceway at points offset on one side of diametrically opposite points therein, a rotary drive member having an eccentric portion projecting into said recess on the side of said pair of dogs farthest removed from the center of said raceway and with a slight clearance between the same and said dogs, a rotary driven member having an eccentric portion projected into said recess on the opposite side of said pair of dogs and in contact with one thereof when under torque, and a bowed resilient member centrally contacting with said last mentioned eccentric portion with said resilient member also engaging peripheral grooves in said dogs and having its opposite ends up turned to embrace said eccentric member whereby said dogs are pressed in firm contact with each other and with their points of bearing on said race member.

6. An irreversible transmission comprising a housing, a cylindrical internal raceway fixed within said housing, a pair of cylindrical dogs within the recess of said cylindrical raceway, the combined diameters of said dogs being less than the diameter of said raceway to have contact therewith at spaced points offset to one side of diametrically opposite points therein, coaxial drive and driven shafts journaled in said housing and provided with eccentric portions projecting into said recess respectively on opposite sides of said pair of dogs, the eccentric portion of said drive member being on the side farthest removed from the center of said raceway, and bowed resilient member for pressing said dogs against each other and the spaced points of contact with said raceway, said bowed member being located between the eccentric portion of said driven member and said pair of dogs and engaging a recess in one.

7. An irreversible transmission comprising a housing, a cylindrical internal raceway fixed within said housing, a pair of peripherally grooved cylindrical dogs within the recess of said cylindrical raceway, the combined diameters of said dogs being less than the diameter of said raceway to have contact therewith at spaced points offset to one side of diametrically opposite points therein, coaxial drive and driven shafts journaled within said housing, the driven shaft being sleeved upon the drive shaft, said shafts having eccentric portions projecting into the recess within said raceway on opposite sides of said pair of dogs, the eccentric portion of said drive member being on the side farthest removed from the center of said raceway, and resilient means for pressing said dogs in contact with each other and the spaced points of contact with said raceway being located in said peripheral grooves and contacting with the eccentric portion of said driven member.

CHARLES F. HAMMOND.